(12) United States Patent
Noda et al.

(10) Patent No.: US 10,209,497 B2
(45) Date of Patent: Feb. 19, 2019

(54) IMAGING LENS AND IMAGING APPARATUS

(71) Applicant: FUJIFILM Corporation, Tokyo (JP)

(72) Inventors: Taiga Noda, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 34 days.

(21) Appl. No.: 15/422,792

(22) Filed: Feb. 2, 2017

(65) Prior Publication Data

US 2017/0254990 A1 Sep. 7, 2017

(30) Foreign Application Priority Data

Mar. 7, 2016 (JP) ................. 2016-043152

(51) Int. Cl.
*G02B 3/02* (2006.01)
*G02B 13/18* (2006.01)
*B60R 1/00* (2006.01)
*B60R 1/12* (2006.01)
*G02B 9/64* (2006.01)
*G02B 13/06* (2006.01)

(52) U.S. Cl.
CPC ............. *G02B 13/18* (2013.01); *B60R 1/00* (2013.01); *B60R 1/12* (2013.01); *G02B 9/64* (2013.01); *G02B 13/06* (2013.01); *B60R 2001/1253* (2013.01); *B60R 2300/802* (2013.01)

(58) Field of Classification Search
CPC . G02B 5/005; G02B 7/02; G02B 9/64; G02B 13/0045; G02B 15/177
USPC .................................. 359/642–830
See application file for complete search history.

(56) References Cited

U.S. PATENT DOCUMENTS

2009/0290227 A1* 11/2009 Izuhara ................ G02B 15/177
 359/682
2012/0120505 A1 5/2012 Nakai et al.

FOREIGN PATENT DOCUMENTS

JP 2012-108302 A 6/2012

* cited by examiner

*Primary Examiner* — Mahidere S Sahle
(74) *Attorney, Agent, or Firm* — Studebaker & Brackett PC (57) ABSTRACT

The imaging lens consists of, in order from an object side: a first lens group G1; a diaphragm; and a second lens group G2 that has a positive refractive power. The first lens group G1 consists of, in order from the object side, a first A lens group G1A that consists of two negative meniscus lenses concave toward an image side, and a first B lens group G1B that consists of only one positive lens or a negative lens and a positive lens. The second lens group G2 consists of, in order from the object side, a biconvex lens, a biconcave lens, one or two biconvex lenses, and a negative meniscus lens that is concave toward the object side. With such a configuration, the imaging lens satisfies predetermined conditional expressions.

17 Claims, 7 Drawing Sheets

EXAMPLE 1

FIG. 1

EXAMPLE 1

FIG. 2

EXAMPLE 2

FIG. 3

EXAMPLE 3

FIG. 4

EXAMPLE 1

FIG. 5
EXAMPLE 2

FIG. 7

IMAGING LENS AND IMAGING APPARATUS

CROSS-REFERENCE TO RELATED APPLICATIONS

The present application claims priority under 35 U.S.C. § 119 to Japanese Patent Application No. 2016-043152, filed on Mar. 7, 2016. Each of the above application(s) is hereby expressly incorporated by reference, in its entirety, into the present application.

BACKGROUND OF THE INVENTION

1. Field of the Invention

The present invention relates to an imaging lens, which is appropriate for a sensing camera, and an imaging apparatus comprising the imaging lens.

2. Description of the Related Art

Recently, cameras are mounted on a vehicle, and are used to assist a driver to check blind areas such as sides lateral to the driver and/or a rear side or are used to recognize images such as vehicles around own vehicle, pedestrians, and/or obstacles. As an imaging lens usable in such a sensing camera, for example, an imaging lens described in JP2012-108302A to be described later is known. JP2012-108302A discloses a lens system having eight elements.

SUMMARY OF THE INVENTION

Generally, there is a demand for a sensing camera to capture an image in a range equal to or greater than field of view of human vision, and thus a certain degree of wide-angle performance is necessary therefor.

In the sensing camera, in order to accurately recognize an object in an acquired image, particularly an imaging lens having small distortion is required. However, in the lens system disclosed in JP2012-108302A, correction of distortion is not sufficient.

The present invention has been made in consideration of the above-mentioned situation, and its object is to provide a high-performance imaging lens, which has a wide angle and in which particularly distortion is satisfactorily corrected, and an imaging apparatus which comprises this imaging lens.

An imaging lens of the present invention consists of, in order from an object side: a first lens group; a diaphragm; and a second lens group that has a positive refractive power. The first lens group consists of, in order from the object side, a first A lens group that consists of a first-1 negative meniscus lens concave toward an image side and a first-2 negative meniscus lens concave toward the image side, and a first B lens group that consists of a first-3 positive lens or a first-3A negative lens and a first-3B positive lens. The second lens group consists of, in order from the object side, a second-1 biconvex lens, a second-2 biconcave lens, a second-3 biconvex lens, and a second-4 negative meniscus lens that is concave toward the object side, or in order from the object side, a second-1 biconvex lens, a second-2 biconcave lens, a second-3A biconvex lens, a second-3B biconvex lens, and a second-4 negative meniscus lens that is concave toward the object side. Then, the imaging lens satisfies the following conditional expressions (1) and (2).

$$-1 < (L22f + L22r)/(L22f - L22r) < 0.5 \tag{1}$$

$$-0.6 < f1A/f1B < -0.25 \tag{2}$$

Here, L22f is a radius of curvature of an object side surface of the second-2 biconcave lens, L22r is a radius of curvature of an image side surface of the second-2 biconcave lens, f1A is a focal length of the first A lens group, and
f1B is a focal length of the first B lens group.

It is preferable that the imaging lens of the present invention satisfies the following conditional expression (1-1) and/or (2-1).

$$-0.8 < (L22f + L22r)/(L22f - L22r) < 0.4 \tag{1-1}$$

$$-0.55 < f1A/f1B < -0.3 \tag{2-1}$$

It is preferable that the imaging lens satisfies the following conditional expression (3), and it is more preferable that the imaging lens satisfies the following conditional expression (3-1).

$$-0.7 < (L23r - L24f)/(L23r + L24f) < -0.1 \tag{3}$$

$$-0.6 < (L23r - L24f)/(L23r + L24f) < -0.15 \tag{3-1}$$

Here, L23r is a radius of curvature of an image side surface of the second-3 biconvex lens or the second-3B biconvex lens, and L24f is a radius of curvature of an object side surface of the second-4 negative meniscus lens.

It is preferable that the imaging lens satisfies the following conditional expression (4), and it is more preferable that the imaging lens satisfies the following conditional expression (4-1).

$$-1 < f/f1A < -0.4 \tag{4}$$

$$-0.85 < f/f1A < -0.5 \tag{4-1}$$

Here, f is a focal length of a whole system, and
f1A is the focal length of the first A lens group.

It is preferable that the imaging lens satisfies the following conditional expression (5), and it is more preferable that the imaging lens satisfies the following conditional expression (5-1).

$$-0.3 < f/f24 < 0 \tag{5}$$

$$-0.23 < f/f24 < -0.03 \tag{5-1}$$

Here, f is the focal length of the whole system, and
f24 is a focal length of the second-4 negative meniscus lens.

It is preferable that the imaging lens satisfies the following conditional expression (6), and it is more preferable that the imaging lens satisfies the following conditional expression (6-1).

$$-1 < (L24f - L24r)/(L24f + L24r) < -0.2 \tag{6}$$

$$-0.85 < (L24f - L24r)/(L24f + L24r) < -0.35 \tag{6-1}$$

Here, L24f is a radius of curvature of an object side surface of the second-4 negative meniscus lens, and L24r is a radius of curvature of an image side surface of the second-4 negative meniscus lens.

It is preferable that an air spacing is provided between the second-3 biconvex lens or the second-3B biconvex lens and the second-4 negative meniscus lens.

It is preferable that the imaging lens satisfies the following conditional expression (7), and it is more preferable that the imaging lens satisfies the following conditional expression (7-1).

$$0.2 < (L11f - L11r)/(L11f + L11r) < 0.7 \tag{7}$$

$$0.3 < (L11f - L11r)/(L11f + L11r) < 0.6 \tag{7-1}$$

Here, L11f is a radius of curvature of an object side surface of the first-1 negative meniscus lens, and L11r is a radius of curvature of an image side surface of the first-1 negative meniscus lens.

It is preferable that the first-2 negative meniscus lens is a lens of which object side and image side surfaces are aspheric surfaces and of which a negative refractive power becomes weak in a periphery thereof as compared with a vicinity of an optical axis thereof.

It is preferable that the second-4 negative meniscus lens is a lens of which object side and image side surfaces are aspheric surfaces and of which a negative refractive power becomes weak in a periphery thereof as compared with a vicinity of an optical axis thereof.

An imaging apparatus of the present invention comprises the above-mentioned imaging lens of the present invention.

It should be noted that the term "includes, substantially ~" means that the imaging lens may include not only the above-mentioned elements but also lenses substantially having no powers, optical elements, which are not lenses, such as a diaphragm, a mask, a cover glass, and a filter, and mechanism parts such as a lens flange, a lens barrel, an imaging element, and/or a hand shaking correction mechanism.

Further, reference signs of surface shapes, radii of curvature, and/or refractive powers of the lenses are assumed as those in paraxial regions in a case where some lenses have aspheric surfaces.

The imaging lens of the present invention consists of, in order from the object side: the first lens group; the diaphragm; and the second lens group that has a positive refractive power. The first lens group consists of, in order from the object side, the first A lens group that consists of the first-1 negative meniscus lens concave toward an image side and the first-2 negative meniscus lens concave toward the image side, and the first B lens group that consists of the first-3 positive lens or the first-3A negative lens and the first-3B positive lens. The second lens group consists of, in order from the object side, the second-1 biconvex lens, the second-2 biconcave lens, the second-3 biconvex lens, and the second-4 negative meniscus lens that is concave toward the object side, or in order from the object side, the second-1 biconvex lens, the second-2 biconcave lens, the second-3A biconvex lens, the second-3B biconvex lens, and the second-4 negative meniscus lens that is concave toward the object side. Then, the imaging lens satisfies the following conditional expressions (1) and (2). Therefore, it is possible to realize a high-performance lens which has a wide angle and in which particularly distortion is satisfactorily corrected.

$$-1<(L22f+L22r)/(L22f-L22r)<0.5 \quad (1)$$

$$-0.6<f1A/f1B<-0.25 \quad (2)$$

Further, the imaging apparatus of the present invention comprises the imaging lens of the present invention. Thus, it is possible to appropriately capture a high quality image with a wide angle.

DESCRIPTION OF THE PREFERRED EMBODIMENTS

Figure 1:
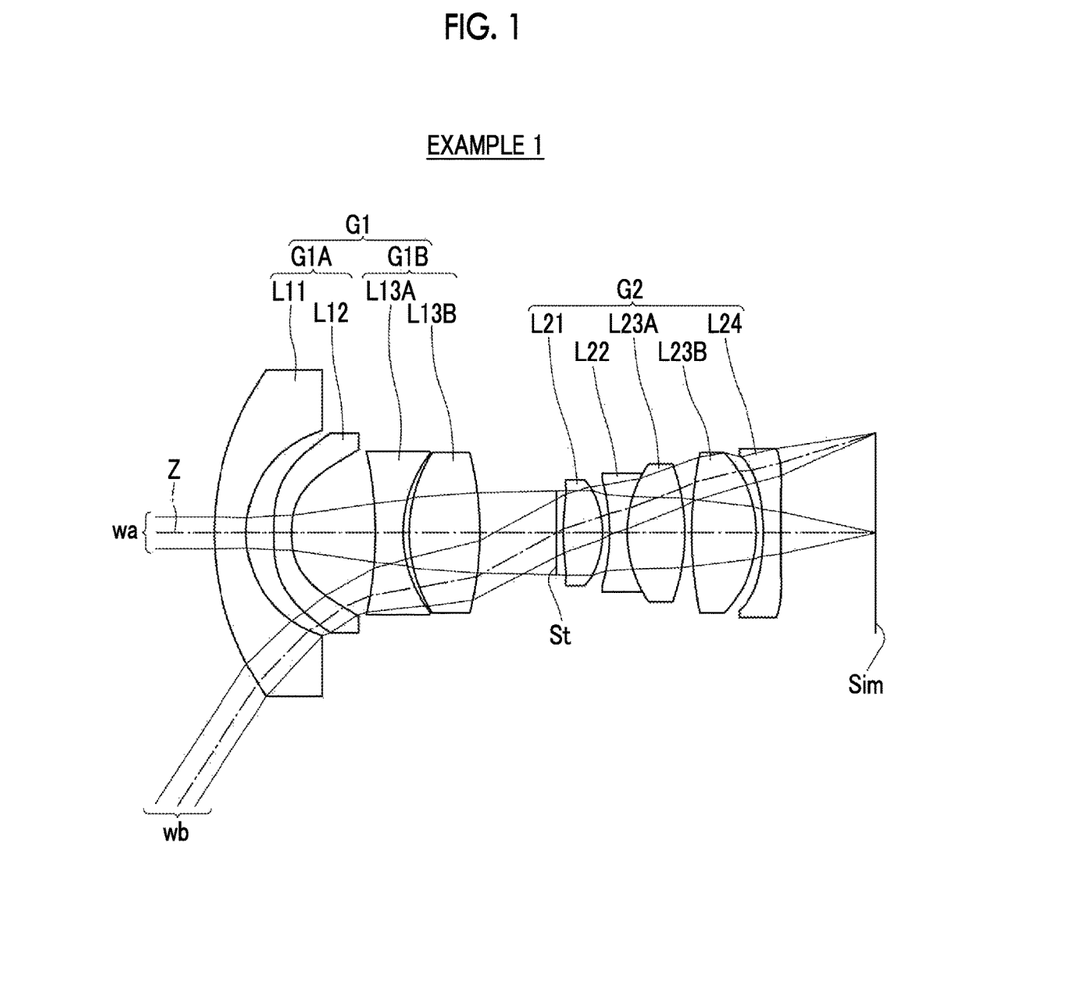
FIG. 1 is a cross-sectional view illustrating a lens configuration of an imaging lens (common to Example 1) according to an embodiment of the present invention.

Hereinafter, embodiments of the present invention will be described with reference to drawings. FIG. 1 is a cross-sectional view illustrating a lens configuration of an imaging lens according to an embodiment of the present invention. The exemplary configuration shown in FIG. 1 is the same as the configuration of the imaging lens of Example 1 to be described later. In FIG. 1, a left side thereof is an object side, and a right side thereof is an image side. In addition, an aperture diaphragm St shown in the drawing does not necessarily indicate its sizes and/or shapes, and indicates a position of the diaphragm on the optical axis Z. Further, on-axis rays wa and rays with a maximum angle of view wb are also shown together.

As shown in FIG. 1, the imaging lens consists of, in order from the object side, a first lens group G1, an aperture diaphragm St, and a second lens group G2 that has a positive refractive power. With such a configuration, it is possible to minimize an incident angle of off-axis rays incident onto an image plane Sim.

The first lens group G1 consists of, in order from the object side, a first A lens group G1A that consists of a first-1 negative meniscus lens L11 concave toward an image side and a first-2 negative meniscus lens L12 concave toward the image side, and a first B lens group G1B that consists of a first-3A negative lens L13A and a first-3B positive lens L13B.

By forming the first A lens group G1A with such a configuration, due to a negative refractive power of the entire first A lens group G1A, it is possible to reduce an angle of off-axis rays incident into lens groups subsequent thereto. In addition, a shape of each negative lens within the first A lens group G1A is a negative meniscus shape that is concave toward the image side. Thus, it is possible to suppress occurrence of distortion. Further, providing such two negative meniscus lenses is more advantageous in correcting distortion. Furthermore, since there is provided no lens having a positive refractive power in the first A lens group G1A, it is not necessary to give an excessive refractive power to the negative lenses in the first A lens group G1A. Thus, occurrence of off-axis high-order aberrations is suppressed, and this configuration is advantageous in achieving a wide angle. In addition, minimizing the number of negative meniscus lenses to two is advantageous in reduction in diameter.

By forming the first B lens group G1B with such a configuration, it is possible to correct distortion and lateral chromatic aberration occurring in the first A lens group G1A. In addition, even when the first B lens group G1B consists of only one first-3 positive lens, it is possible to obtain the same effects mentioned above.

The second lens group G2 consists of, in order from the object side, a second-1 biconvex lens L21, a second-2 biconcave lens L22, a second-3A biconvex lens L23A, a second-3B biconvex lens L23B, and a second-4 negative meniscus lens L24 that is concave toward the object side.

As described above, in order from the most object side in the second lens group G2, three lenses, that is, a positive lens, a negative lens, and a positive lens are continuously arranged. Thereby, it is possible to satisfactorily correct various aberrations such as longitudinal chromatic aberration, lateral chromatic aberration, spherical aberration, and astigmatism occurring in the second lens group G2. Further, among the three lenses, each positive lens is formed in a biconvex shape, and the negative lens is formed in a biconcave shape. Thereby, it is possible to suppress occurrence of spherical aberration in each lens.

The second-4 negative meniscus lens L24 having a negative refractive power is disposed to be closest to the image side within the second lens group G2, that is, to be closest to the image side of the whole system. Thereby, it is possible to correct negative distortion occurring in the two lenses of the first-1 negative meniscus lens L11 and the first-2 negative meniscus lens L12 closest to the object side of the whole system. Further, the second-4 negative meniscus lens L24 is formed as a meniscus shape which is concave toward the object side. Thereby, even when distortion is corrected by giving a strong refractive power to the second-4 negative meniscus lens L24, it is possible to suppress occurrence of astigmatism.

Even when the second lens group G2 consists of, in order from the object side, a second-1 biconvex lens, a second-2 biconcave lens, a second-3 biconvex lens, and a second-4 negative meniscus lens that is concave toward the object side, it is possible to obtain the same effects mentioned above.

The imaging lens is configured to satisfy the following conditional expressions (1) and (2). By satisfying the conditional expression (1), it is possible to correct spherical aberration in an appropriate range. By not allowing the result of the conditional expression (2) to be equal to or less than the lower limit, occurrence of distortion in the first lens group G1 is suppressed, and a height of on-axis marginal rays into the second lens group G2 is suppressed. As a result, it is possible to suppress occurrence of spherical aberration. By not allowing the result of the conditional expression (2) to be equal to or greater than the upper limit, it is possible to reduce an incident angle of off-axis principal rays incident into the second lens group G2. As a result, it is possible to suppress occurrence of astigmatism, distortion, and lateral chromatic aberration in the second lens group G2. In addition, if the following conditional expression (1-1) and/or (2-1) is satisfied, it is possible to obtain more favorable characteristics.

$$-1<(L22f+L22r)/(L22f-L22r)<0.5 \qquad (1)$$

$$-0.8<(L22f+L22r)/(L22f-L22r)<0.4 \qquad (1\text{-}1)$$

$$-0.6<f1A/f1B<-0.25 \qquad (2)$$

$$-0.55<f1A/f1B<-0.3 \qquad (2\text{-}1)$$

Here, L22f is a radius of curvature of an object side surface of the second-2 biconcave lens, L22r is a radius of curvature of an image side surface of the second-2 biconcave lens, f1A is a focal length of the first A lens group, and f1B is a focal length of the first B lens group.

It is preferable that the imaging lens of the present embodiment satisfies the following conditional expression (3). By not allowing the result of the conditional expression (3) to be equal to or less than the lower limit, high-order spherical aberration is prevented from occurring. As a result, it is possible to minimize the incident angle of off-axis rays incident onto the image plane Sim. By not allowing the result of the conditional expression (3) to be equal to or greater than the upper limit, a height of on-axis marginal rays incident into the second-4 negative meniscus lens L24 decreases. Thus, it is possible to give a negative refractive power to the second-4 negative meniscus lens L24 while suppressing effects on spherical aberration. As a result, it is possible to appropriately correct distortion even at a wide angle. In addition, if the following conditional expression (3-1) is satisfied, it is possible to obtain more favorable characteristics.

$$-0.7<(L23r-L24f)/(L23r+L24f)<-0.1 \qquad (3)$$

$$-0.6<(L23r-L24f)/(L23r+L24f)<-0.15 \qquad (3\text{-}1)$$

Here, L23r is a radius of curvature of an image side surface of the second-3 biconvex lens or the second-3B biconvex lens, and L24f is a radius of curvature of an object side surface of the second-4 negative meniscus lens.

It is preferable that the imaging lens satisfies the following conditional expression (4). By not allowing the result of the conditional expression (4) to be equal to or less than the lower limit, it is possible to suppress occurrence of distortion. By not allowing the result of the conditional expression (4) to be equal to or greater than the upper limit, an angle of off-axis principal rays incident into the subsequent lens groups. As a result, it is possible to suppress occurrence of astigmatism even at a wide angle. In addition, if the following conditional expression (4-1) is satisfied, it is possible to obtain more favorable characteristics.

$$-1<f/f1A<-0.4 \qquad (4)$$

$$-0.85<f/f1A<-0.5 \qquad (4\text{-}1)$$

Here, f is a focal length of the whole system, and f1A is the focal length of the first A lens group.

It is preferable that the imaging lens satisfies the following conditional expression (5). By not allowing the result of the conditional expression (5) to be equal to or less than the lower limit, it is possible to minimize the incident angle of off-axis rays incident onto the image plane Sim. By not allowing the result of the conditional expression (5) to be equal to or greater than the upper limit, it is possible to appropriately correct astigmatism. In addition, if the following conditional expression (5-1) is satisfied, it is possible to obtain more favorable characteristics.

$$-0.3<f/f24<0 \qquad (5)$$

$$-0.23<f/f24<-0.03 \qquad (5\text{-}1)$$

Here, f is the focal length of the whole system, and f24 is a focal length of the second-4 negative meniscus lens.

It is preferable that the imaging lens satisfies the following conditional expression (6). By not allowing the result of the conditional expression (6) to be equal to or less than the lower limit, it is possible to suppress occurrence of astigmatism. By not allowing the result of the conditional expression (6) to be equal to or greater than the upper limit, it is possible to appropriately correct distortion. In addition, if the following conditional expression (6-1) is satisfied, it is possible to obtain more favorable characteristics.

$$-1<(L24f-L24r)/(L24f+L24r)<-0.2 \qquad (6)$$

$$-0.85<(L24f-L24r)/(L24f+L24r)<-0.35 \qquad (6\text{-}1)$$

Here, L24f is a radius of curvature of an object side surface of the second-4 negative meniscus lens, and L24r is a radius of curvature of an image side surface of the second-4 negative meniscus lens.

It is preferable that an air spacing is provided between the second-3B biconvex lens L23B and the second-4 negative meniscus lens L24. With such a configuration, it is possible to control the height of the off-axis principal rays incident into the second-4 negative meniscus lens L24. Thus, it is possible to appropriately correct spherical aberration, or it is possible to appropriately correct distortion even at a wide angle. In addition, in a case where only one biconvex lens is provided between the second-2 biconcave lens L22 and the second-4 negative meniscus lens L24, an air spacing is provided between the biconvex lens and the second-4 negative meniscus lens L24.

It is preferable that the imaging lens satisfies the following conditional expression (7). By not allowing the result of the conditional expression (7) to be equal to or less than the lower limit, an angle of off-axis principal rays incident into the lens groups subsequent to the first-1 negative meniscus lens L11 is reduced. As a result, it is possible to suppress occurrence of astigmatism even at a wide angle. By not allowing the result of the conditional expression (7) to be equal to or greater than the upper limit, it is possible to suppress occurrence of distortion and astigmatism. In addition, if the following conditional expression (7-1) is satisfied, it is possible to obtain more favorable characteristics.

$$0.2<(L11f-L11r)/(L11f+L11r)<0.7 \quad (7)$$

$$0.3<(L11f-L11r)/(L11f+L11r)<0.6 \quad (7\text{-}1)$$

Here, L11f is a radius of curvature of an object side surface of the first-1 negative meniscus lens L11, and L11r is a radius of curvature of an image side surface of the first-1 negative meniscus lens L11.

It is preferable that the first-2 negative meniscus lens L12 is a lens of which object side and image side surfaces are aspheric surfaces and of which a negative refractive power becomes weak in a periphery thereof as compared with the vicinity of an optical axis thereof. With such a configuration, it is possible to effectively suppress occurrence of distortion.

It is preferable that the object side and image side surfaces of the second-1 biconvex lens L21 are aspheric surfaces. With such a configuration, it is possible to effectively suppress occurrence of spherical aberration.

It is preferable that the second-4 negative meniscus lens L24 is a lens of which object side and image side surfaces are aspheric surfaces and of which a negative refractive power becomes weak in a periphery thereof as compared with the vicinity of an optical axis thereof. With such a configuration, it is possible to effectively correct distortion and astigmatism.

In a case of using the imaging lens under severe environment, it is preferable to perform protective multilayer film coating. Not only the protective coating but also anti-reflective coating for reducing ghost light in use may be performed.

If the imaging lens is intended to be applied to imaging apparatus, a cover glass, a prism, and/or various filters such as an infrared cut filter and a lowpass filter may be disposed between the lens system and an image plane Sim in accordance with a configuration of a camera on which the lens is mounted. In addition, instead of positioning such various filters between the lens system and the image plane Sim, such various filters may be disposed between lenses, and coating for applying the same effects as the various filters may be performed on a lens surface of any one lens thereof Next, numerical examples of the imaging lens of the present invention will be described.

Figure 2:
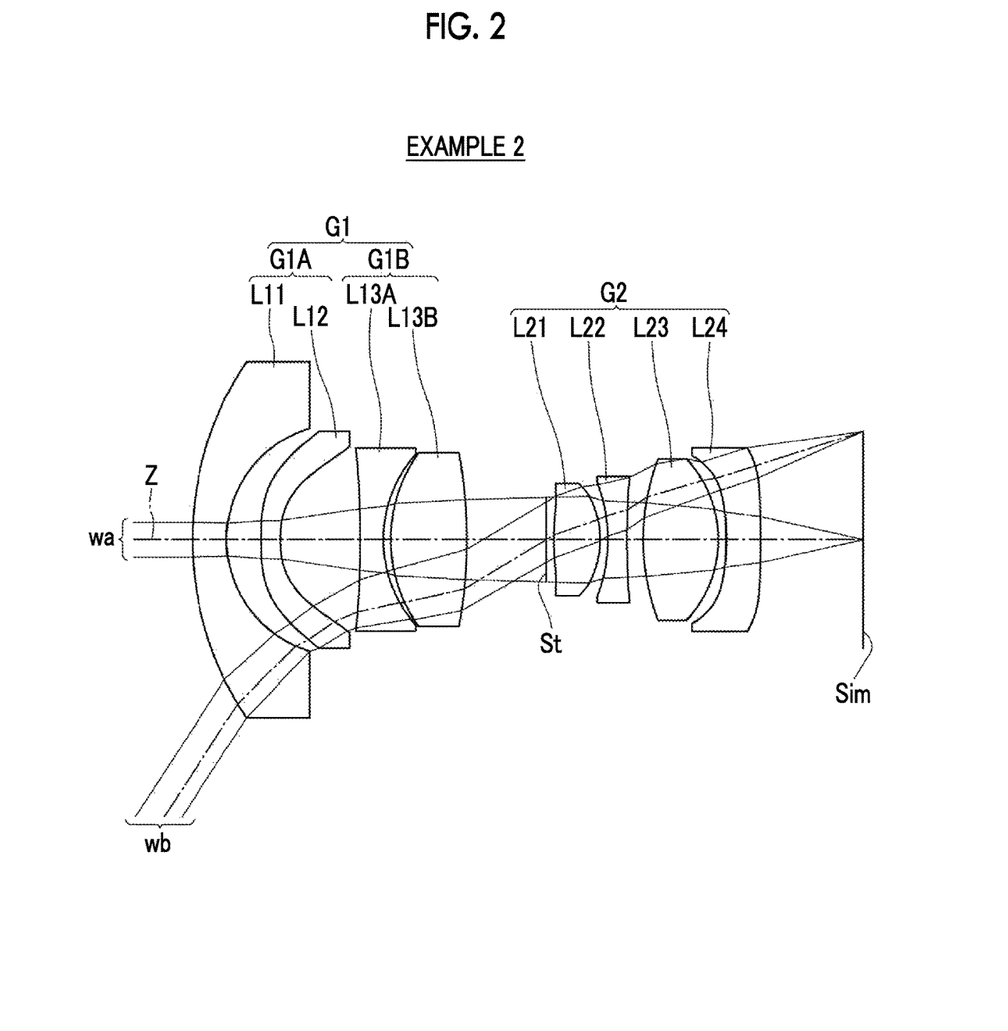
FIG. 2 is a cross-sectional view illustrating a lens configuration of an imaging lens of Example 2 of the present invention.
Figure 3:
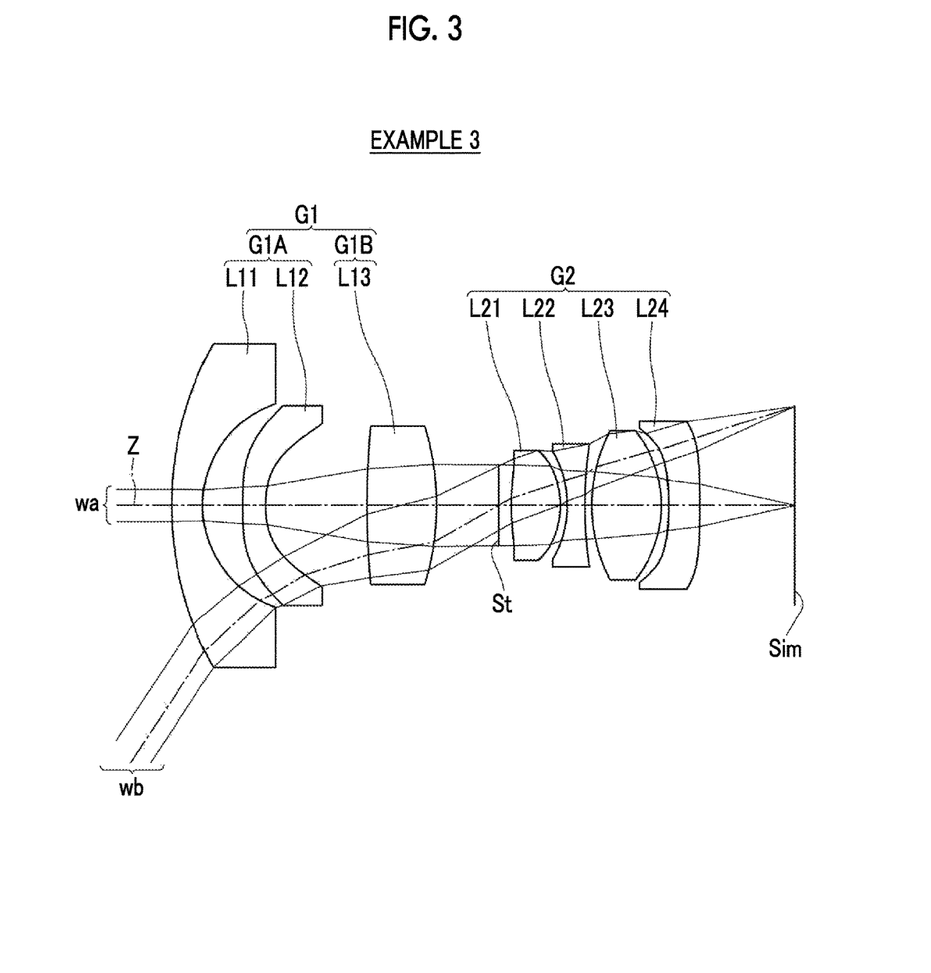
FIG. 3 is a cross-sectional view illustrating a lens configuration of an imaging lens of Example 3 of the present invention.

First, the imaging lens of Example 1 will be described. FIG. 1 is a cross-sectional view illustrating a lens configuration of the imaging lens of Example 1. In FIG. 1 and FIGS. 2 and 3 corresponding to Examples 2 and 3 to be described later, left sides thereof are the object side, and right sides thereof are the image side. In addition, the aperture diaphragm St shown in the drawings does not necessarily indicate its sizes and/or shapes, and indicates a position of the diaphragm on the optical axis Z.

Table 1 shows basic lens data of the imaging lens of Example 1, Table 2 shows data about specification, and Table 3 shows data about aspheric coefficients. Hereinafter, meanings of the reference signs in the tables are, for example, as described in Example 1, and are basically the same as those in Examples 2 and 3.

In the lens data of Table 1, the column of the surface number shows surface numbers. The surface of the elements closest to the object side is the first surface, and the surface numbers sequentially increase toward the image side. The column of the radius of curvature shows radii of curvature of the respective surfaces. The column of the surface distance shows spacings on the optical axis Z between the respective surfaces and the subsequent surfaces. The column of n shows refractive indexes of the respective optical elements at the d-line (a wavelength of 587.6 nm, where nm represents nanometer). The column of ν shows Abbe numbers of the respective optical elements at the d-line (a wavelength of 587.6 nm).

Here, the sign of the radius of curvature is positive in a case where a surface has a shape convex toward the object side, and is negative in a case where a surface has a shape convex toward the image side. The basic lens data also includes and indicates the aperture diaphragm St. In a place of a surface number of a surface corresponding to the aperture diaphragm St, the surface number and a term of (diaphragm) are noted.

The data about specification of Table 2 shows values of a focal length f' of the whole system, a back focal length Bf', an F number FNo, and a total angle of view 2w.

In the basic lens data and the data about specification, a degree is used as a unit of an angle, and mm is used as a unit of a length, but appropriate different units may be used since the optical system can be used even in a case where the system is enlarged or reduced in proportion.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 3 shows the surface numbers of the aspheric surfaces and aspheric coefficients of the aspheric surfaces. The "E±n" (n: an integer) in numerical values of the aspheric coefficients of Table 3 indicates "×10$^{\pm n}$". The aspheric coefficients are values of the coefficients KA and Am (m=3 . . . 12) in aspheric surface expression represented as the following expression.

$$Zd=C\cdot h^2/\{1+(1-KA\cdot C^2\cdot h^2)^{1/2}\}\Sigma Am\cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of a paraxial radius of curvature, and KA and Am are aspheric coefficients (m=3 . . . 12).

TABLE 1

Example 1 Lens Data (n and ν are at d-line)

| SURFACE NUMBER | RADIUS OF CURVATURE | SURFACE SPACING | n | ν |
|---|---|---|---|---|
| 1 | 8.98318 | 1.014 | 1.79999 | 30.26 |
| 2 | 3.43522 | 0.901 | | |
| *3 | 22.50394 | 0.563 | 1.53112 | 55.30 |
| *4 | 3.68220 | 2.676 | | |
| 5 | −12.22962 | 0.887 | 1.59282 | 68.62 |
| 6 | 4.15390 | 0.199 | | |
| 7 | 4.87574 | 2.253 | 1.88300 | 40.76 |
| 8 | −10.36724 | 2.454 | | |
| 9 (DIAPHRAGM) | ∞ | 0.225 | | |
| *10 | 6.92630 | 1.255 | 1.53112 | 55.30 |
| *11 | −3.01068 | 0.225 | | |
| 12 | −6.22711 | 0.563 | 1.80400 | 35.50 |
| 13 | 3.88656 | 1.837 | 1.49700 | 81.54 |
| 14 | −6.46816 | 0.225 | | |
| 15 | 12.75669 | 2.075 | 1.49700 | 81.54 |
| 16 | −3.74073 | 0.225 | | |
| *17 | −6.05338 | 0.563 | 1.63360 | 23.61 |
| *18 | −41.12208 | 3.024 | | |

TABLE 2

Example 1 Specification

| | |
|---|---|
| f | 2.350 |
| Bf | 3.024 |
| FNo. | 2.30 |
| 2ω [°] | 113.6 |

TABLE 3

Example 1 Aspheric Coefficients

| | SURFACE NUMBER | | |
|---|---|---|---|
| | 3 | 4 | 10 |
| KA | 1.0000000E+00 | −4.1390485E+00 | 1.0000000E+00 |
| A3 | 0.0000000E+00 | 2.9764722E−03 | 0.0000000E+00 |
| A4 | 5.9676977E−02 | 6.2876551E−02 | −1.8721410E−03 |
| A5 | −1.8990572E−02 | 7.0540585E−03 | −1.8046466E−02 |
| A6 | −3.2780212E−03 | −2.1279975E−02 | 1.4733917E−02 |
| A7 | 2.4889927E−03 | 3.3207437E−03 | 3.6186878E−03 |
| A8 | 1.4716371E−04 | 4.2352014E−03 | −1.1788037E−02 |
| A9 | −2.0522287E−04 | −1.5472241E−03 | 1.1521912E−03 |
| A10 | −5.1083795E−06 | −1.6806023E−04 | 2.0906485E−03 |
| A11 | 1.1666699E−05 | 1.2883980E−04 | 9.3063825E−04 |
| A12 | −1.1875211E−06 | −1.3417545E−05 | −8.6667852E−04 |

| | SURFACE NUMBER | | |
|---|---|---|---|
| | 11 | 17 | 18 |
| KA | 1.0000000E+00 | 1.0000000E+00 | 1.0000000E+00 |
| A3 | 4.5100940E−17 | 0.0000000E+00 | 6.8531722E−19 |
| A4 | 6.0813774E−03 | 1.2353737E−02 | 1.8111073E−02 |
| A5 | −5.7276760E−04 | −2.8042453E−03 | −2.2225228E−03 |
| A6 | −1.6174021E−02 | −5.1293407E−03 | −4.5996703E−03 |
| A7 | 1.6974606E−02 | 1.1812411E−03 | 3.6467851E−04 |
| A8 | 1.7954571E−03 | 5.5506533E−04 | 4.0014983E−04 |
| A9 | −1.2330821E−02 | −3.4767942E−04 | −8.1268901E−06 |
| A10 | 5.0358084E−03 | 2.9282318E−05 | −1.6398236E−05 |
| A11 | 7.5023543E−04 | 2.9839912E−05 | −2.3621856E−06 |
| A12 | −5.9413845E−04 | −7.3115240E−06 | 6.8570032E−07 |

Figure 4:
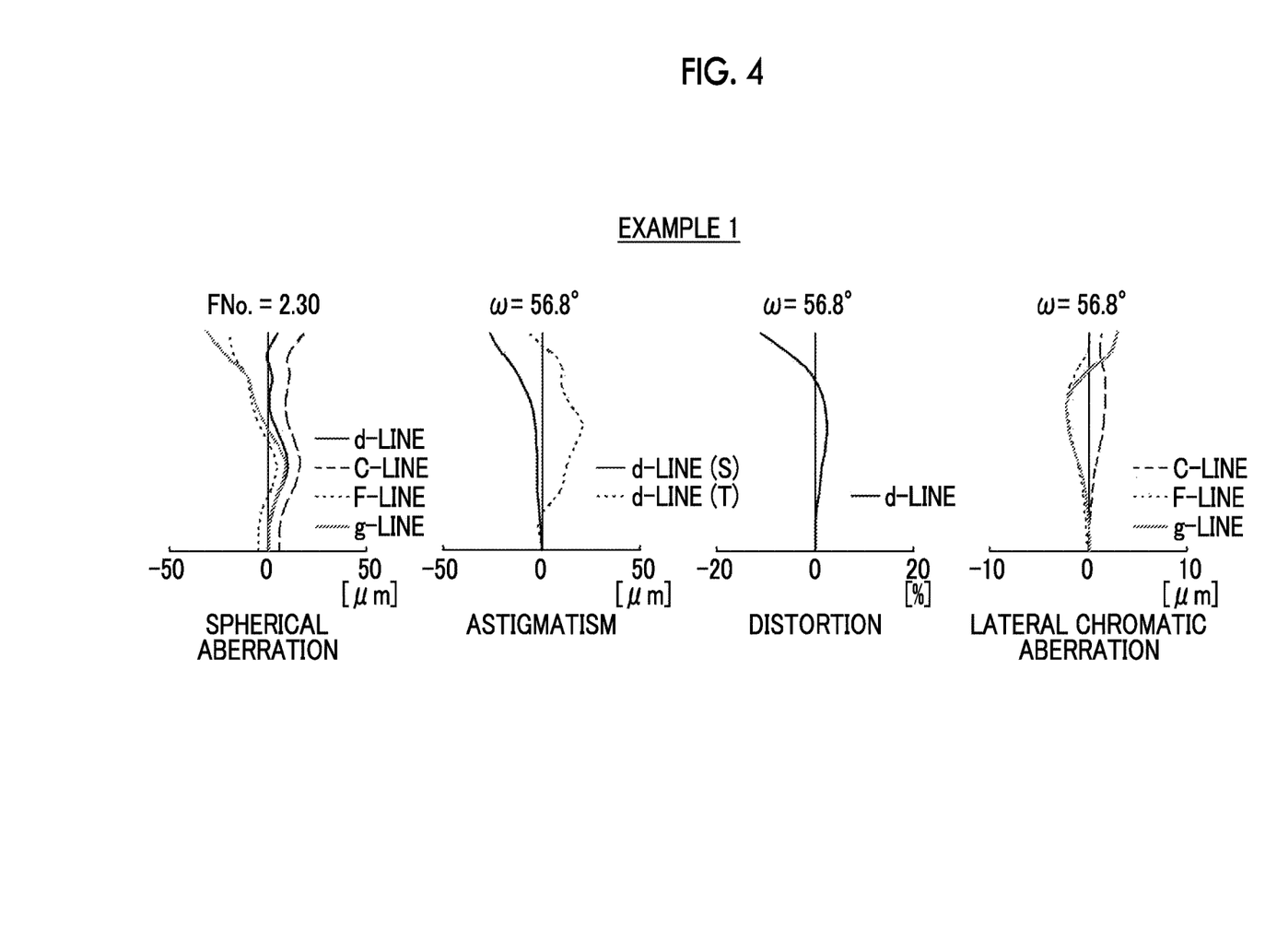
FIG. 4 is a diagram of aberrations of the imaging lens of Example 1 of the present invention.

FIG. 4 shows aberration diagrams of the imaging lens of Example 1. In addition, in order from the left side of FIG. 4, spherical aberration, astigmatism, distortion, and lateral chromatic aberration are shown. Such aberration diagrams show aberrations in a state where the object distance is set as an infinite distance. The aberration diagrams illustrating spherical aberration, astigmatism, and distortion indicates aberrations that occurs when the d-line (a wavelength of 587.6 nm) is set as a reference wavelength. In the spherical aberration diagram, aberrations at the d-line (a wavelength of 587.6 nm), the C-line (a wavelength of 656.3 nm), the F-line (a wavelength of 486.1 nm), and the g-line (a wavelength of 435.8 nm) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C-line (a wavelength of 656.3 nm), the F-line (a wavelength of 486.1 nm), and the g-line (a wavelength of 435.8 nm) are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Figure 5:
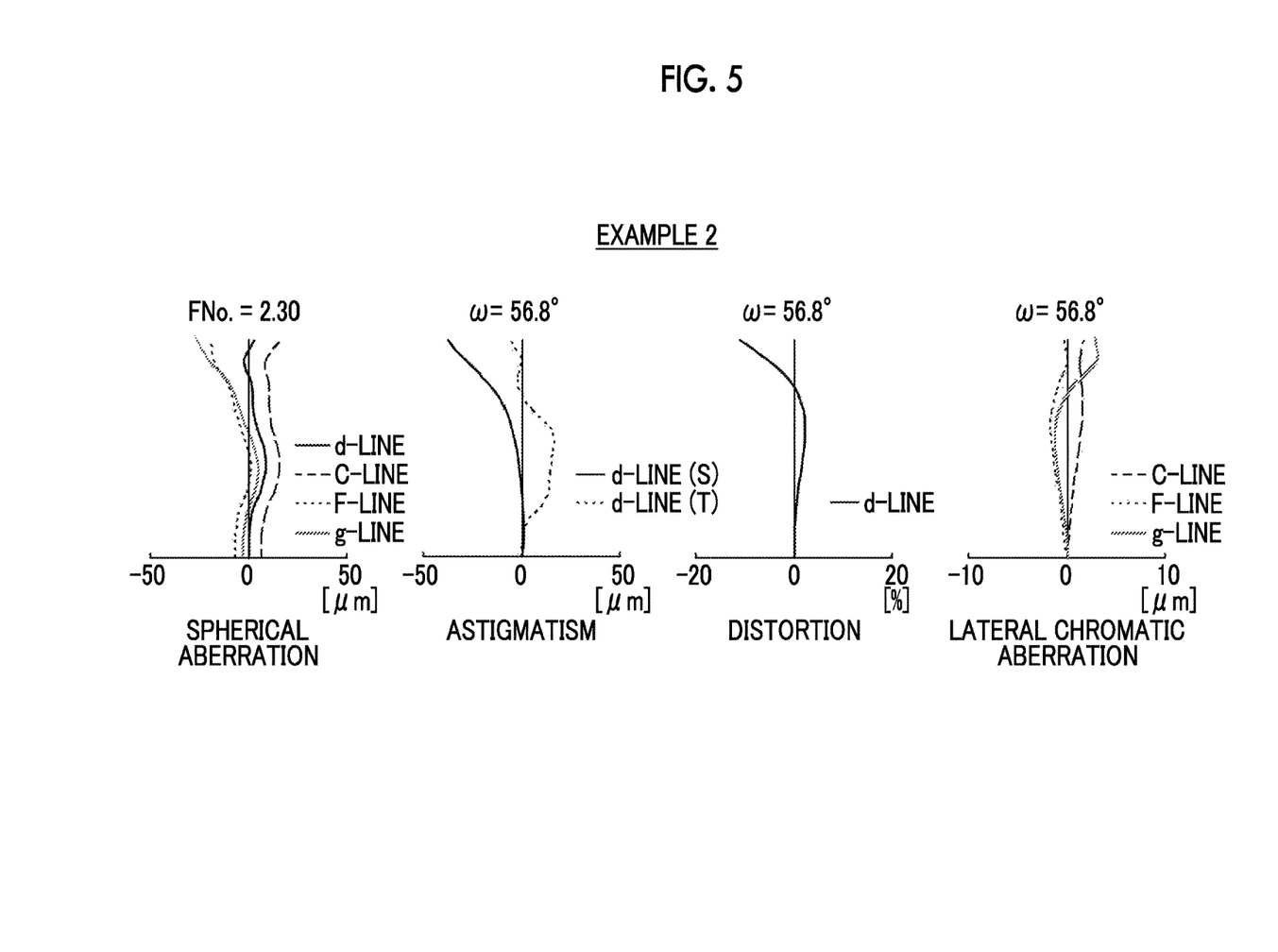
FIG. 5 is a diagram of aberrations of the imaging lens of Example 2 of the present invention.

Next, an imaging lens of Example 2 will be described. FIG. 2 is a cross-sectional view illustrating a lens configuration of the imaging lens of Example 2. Compared with Example 1, the lens configuration of the imaging lens of Example 2 is different in that the second lens group G2 consists of, in order from the object side, a second-1 biconvex lens L21, a second-2 biconcave lens L22, a second-3 biconvex lens L23, and a second-4 negative meniscus lens L24 that is concave toward the object side. Further, Table 4 shows basic lens data of the imaging lens of Example 2, Table 5 shows data about specification, and Table 6 shows data about aspheric coefficients. FIG. 5 shows aberration diagrams thereof

TABLE 4

Example 2 Lens Data (n and ν are at d-line)

| SURFACE NUMBER | RADIUS OF CURVATURE | SURFACE SPACING | n | ν |
|---|---|---|---|---|
| 1 | 9.39276 | 1.014 | 1.79208 | 38.78 |
| 2 | 3.43523 | 1.013 | | |
| *3 | 18.91385 | 0.563 | 1.53112 | 55.30 |
| *4 | 3.68221 | 2.359 | | |
| 5 | −27.33371 | 0.676 | 1.59282 | 68.62 |
| 6 | 3.79844 | 0.219 | | |
| 7 | 4.40991 | 2.254 | 1.88300 | 40.76 |
| 8 | −14.10456 | 2.337 | | |
| 9 (DIAPHRAGM) | ∞ | 0.225 | | |
| *10 | 8.04250 | 1.360 | 1.53112 | 55.30 |
| *11 | −2.70028 | 0.225 | | |
| 12 | −4.65731 | 0.563 | 1.77445 | 26.28 |
| 13 | 22.47945 | 0.479 | | |
| 14 | 6.63617 | 2.226 | 1.49700 | 81.54 |
| 15 | −3.47707 | 0.225 | | |
| *16 | −8.76243 | 1.014 | 1.63360 | 23.61 |
| *17 | −32.88801 | 3.023 | | |

TABLE 5

Example 2 Specification

| | |
|---|---|
| f | 2.354 |
| Bf | 3.023 |
| FNo. | 2.30 |
| 2ω [°] | 113.6 |

TABLE 6

Example 2 Aspheric Coefficients

| | SURFACE NUMBER | | |
|---|---|---|---|
| | 3 | 4 | 10 |
| KA | 1.0000000E+00 | −1.9175480E+00 | 1.0000000E+00 |
| A3 | 7.8080107E−18 | 2.9320140E−03 | 1.7738518E−17 |
| A4 | 5.5687585E−02 | 5.4882865E−02 | −2.3126926E−03 |
| A5 | −1.8451580E−02 | 1.7516449E−03 | −1.9640344E−02 |
| A6 | −2.1880367E−03 | −1.5484078E−02 | 1.7714272E−02 |
| A7 | 2.1341449E−03 | 3.1566075E−03 | 2.7718557E−03 |
| A8 | 4.7023226E−05 | 2.9433974E−03 | −1.4462440E−02 |
| A9 | −1.6148133E−04 | −1.3068990E−03 | 1.1878606E−03 |
| A10 | −3.5969531E−06 | −8.5059608E−05 | 3.8272484E−03 |
| A11 | 1.0028374E−05 | 1.0919769E−04 | 8.2073419E−04 |
| A12 | −1.0714703E−06 | −1.3417545E−05 | −1.2845565E−03 |

| | SURFACE NUMBER | | |
|---|---|---|---|
| | 11 | 16 | 17 |
| KA | 1.0000000E+00 | 1.0000000E+00 | 1.0000000E+00 |
| A3 | −4.5100940E−17 | 2.1353475E−18 | −5.4825378E−19 |
| A4 | 4.9373355E−03 | −5.8928639E−03 | 2.3508336E−03 |
| A5 | 1.8761674E−03 | 5.8042308E−04 | 1.2108857E−03 |
| A6 | −1.8277235E−02 | −4.9606302E−04 | −1.6240194E−03 |
| A7 | 1.7899525E−02 | −1.9847574E−03 | −9.0033297E−04 |
| A8 | 1.9985085E−03 | 4.6209814E−04 | 2.4955003E−04 |
| A9 | −1.3523877E−02 | 3.0100961E−04 | 1.4830458E−04 |
| A10 | 5.6422038E−03 | −1.2492274E−04 | −3.2544388E−05 |
| A11 | 9.2775428E−04 | −1.4894502E−05 | −8.8063785E−06 |
| A12 | −7.3575824E−04 | 8.8559569E−06 | 2.1372283E−06 |

Figure 6:
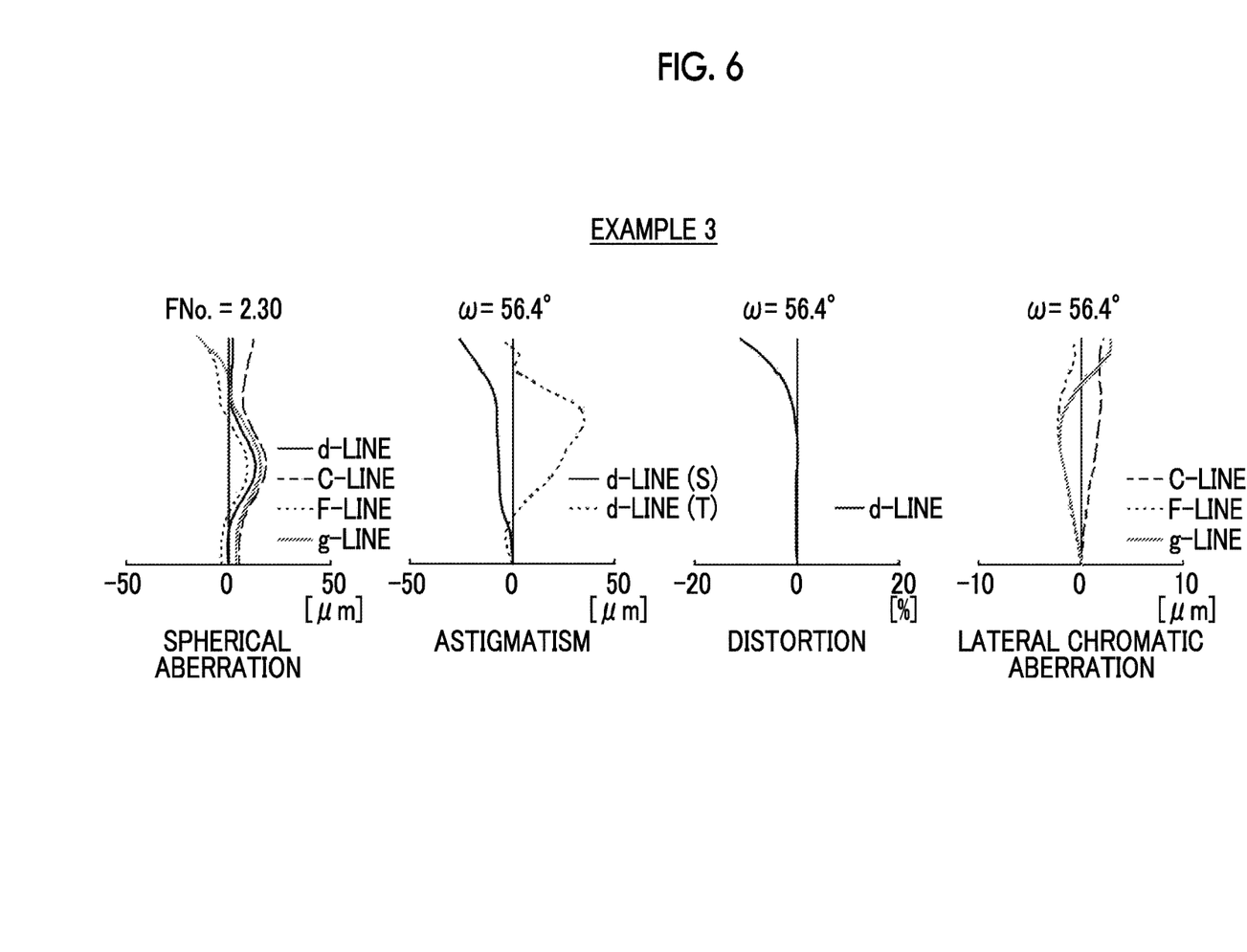
FIG. 6 is a diagram of aberrations of the imaging lens of Example 3 of the present invention.

Next, an imaging lens of Example 3 will be described. FIG. 3 is a cross-sectional view illustrating a lens configuration of the imaging lens of Example 3. Compared with Example 1, the lens configuration of the imaging lens of Example 3 is different in the following points: the first B lens group G1B consists of only one first-3 positive lens L13; and the second lens group G2 consists of, in order from the object side, a second-1 biconvex lens L21, a second-2 biconcave lens L22, a second-3 biconvex lens L23, and a second-4 negative meniscus lens L24 that is concave toward the object side. Further, Table 7 shows basic lens data of the imaging lens of Example 3, Table 8 shows data about specification, and Table 9 shows data about aspheric coefficients. FIG. 6 shows aberration diagrams thereof

TABLE 7

Example 3 Lens Data (n and ν are at d-line)

| SURFACE NUMBER | RADIUS OF CURVATURE | SURFACE SPACING | n | ν |
|---|---|---|---|---|
| 1 | 10.69505 | 1.014 | 1.78957 | 49.04 |
| 2 | 3.48138 | 1.288 | | |
| *3 | 56.34310 | 0.732 | 1.53112 | 55.30 |
| *4 | 3.68222 | 3.268 | | |
| 5 | 27.79211 | 2.253 | 1.90043 | 37.37 |
| 6 | −8.68247 | 2.006 | | |
| 7 (DIAPHRAGM) | ∞ | 0.402 | | |
| *8 | 8.20705 | 1.577 | 1.53112 | 55.30 |
| *9 | −2.66149 | 0.225 | | |
| 10 | −3.44691 | 0.563 | 1.72532 | 28.73 |
| 11 | 13.26282 | 0.225 | | |
| 12 | 5.19569 | 2.254 | 1.49700 | 81.54 |
| 13 | −3.80329 | 0.225 | | |
| *14 | −10.36119 | 1.014 | 1.63360 | 23.61 |
| *15 | −26.19966 | 3.052 | | |

TABLE 8

Example 3 Specification

| f' | 2.391 |
|---|---|
| Bf | 3.052 |
| FNo. | 2.30 |
| 2ω [°] | 112.8 |

TABLE 9

Example 3 Aspheric Coefficients

| | SURFACE NUMBER | | |
|---|---|---|---|
| | 3 | 4 | 8 |
| KA | 1.0000000E+00 | −1.3085677E+00 | 1.0000000E+00 |
| A3 | −7.8080107E−18 | 2.8221285E−03 | 1.4190815E−17 |
| A4 | 3.8760761E−02 | 3.7858538E−02 | −2.1748193E−03 |
| A5 | −1.2640828E−02 | 3.6770295E−03 | 2.9461798E−03 |
| A6 | 1.1237764E−03 | −9.0015864E−03 | −1.3266643E−02 |
| A7 | 1.0649668E−04 | 1.5938193E−03 | 1.6594493E−02 |
| A8 | −6.6165987E−05 | 2.0631361E−03 | −3.8961864E−03 |
| A9 | 6.9556927E−05 | −1.0525901E−03 | −9.6855201E−03 |
| A10 | −2.5707626E−05 | −4.5511580E−05 | 4.2654794E−03 |
| A11 | 1.5063679E−06 | 9.7746767E−05 | 2.7139836E−03 |
| A12 | 3.5612923E−07 | −1.3417545E−05 | −1.5792452E−03 |

| | SURFACE NUMBER | | |
|---|---|---|---|
| | 9 | 14 | 15 |
| KA | 1.0000000E+00 | 1.0000000E+00 | 1.0000000E+00 |
| A3 | −2.2550470E−17 | −5.6942601E−18 | 0.0000000E+00 |
| A4 | −1.1520721E−04 | −1.0764433E−02 | −6.4014275E−03 |
| A5 | 3.1396000E−02 | 1.5562189E−03 | 9.1023030E−03 |
| A6 | −5.4726015E−02 | 6.7916792E−03 | −1.6702846E−03 |
| A7 | 2.6602125E−02 | −7.2762492E−03 | −2.8499790E−03 |
| A8 | 1.7327203E−02 | −2.5603841E−04 | 6.3271368E−04 |
| A9 | −2.2732318E−02 | 1.9709164E−03 | 3.2466602E−04 |
| A10 | 4.6734449E−03 | −4.3760993E−04 | −8.6572725E−05 |
| A11 | 2.4451008E−03 | −1.5762188E−04 | −1.3418549E−05 |
| A12 | −9.0744968E−04 | 5.3601661E−05 | 4.3333480E−06 |

Table 10 shows values corresponding to the conditional expressions (1) to (7) of the imaging lenses of Examples 1 to 3. It should be noted that, in the above-mentioned examples, the d-line is set as the reference wavelength, and the values shown in the following Table 10 are values at the reference wavelength.

TABLE 10

| EXPRESSION NUMBER | CONDITIONAL EXPRESSION | EXAMPLE 1 | EXAMPLE 2 | EXAMPLE 3 |
|---|---|---|---|---|
| (1) | (L22f + L22r)/(L22f − L22r) | 0.231 | −0.657 | −0.587 |
| (2) | f1A/f1B | −0.333 | −0.352 | −0.431 |
| (3) | (L23r − L24f)/(L23r + L24f) | −0.236 | −0.432 | −0.463 |
| (4) | f/f1A | −0.627 | −0.629 | −0.733 |
| (5) | f/f24 | −0.208 | −0.123 | −0.086 |
| (6) | (L24f − L24r)/(L24f − L24r) | −0.743 | −0.579 | −0.433 |
| (7) | (L11f − L11r)/(L11f + L11r) | 0.447 | 0.464 | 0.509 |

As can be seen from the above-mentioned data, all the imaging lenses of Examples 1 to 3 satisfy the conditional expressions (1) to (7), and are high-performance imaging lenses each of which has a total angle of view equal to or greater than 100° and has a wide angle and in which particularly distortion is satisfactorily corrected.

Figure 7:
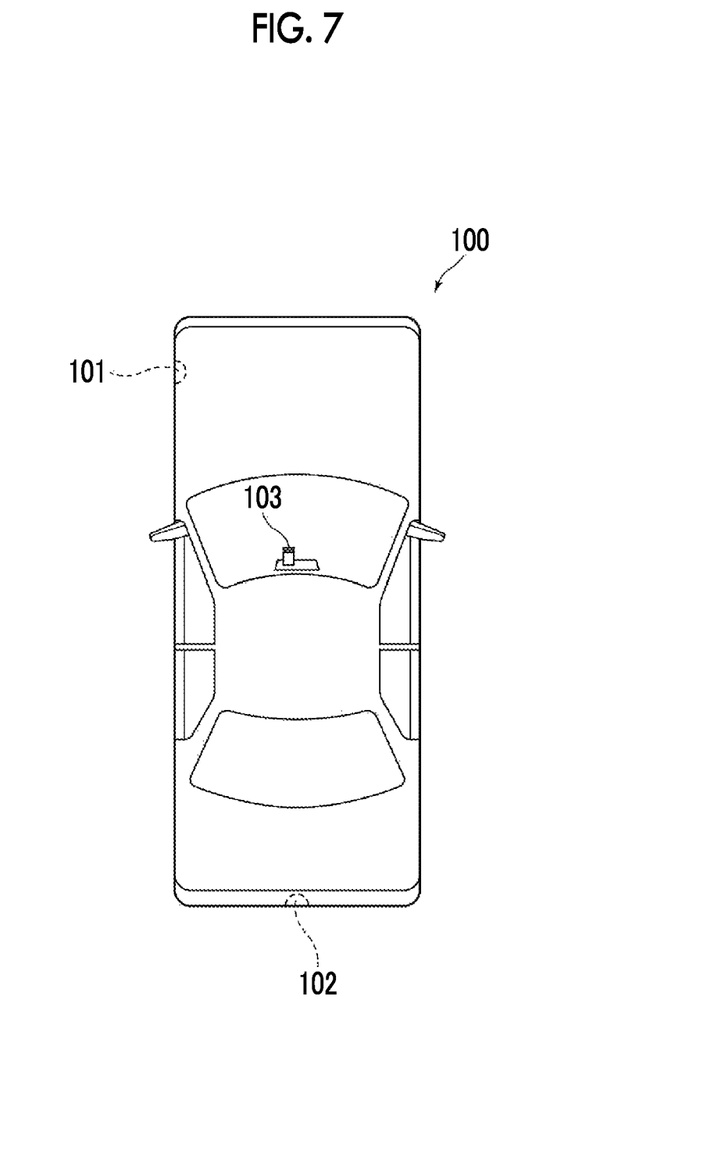
FIG. 7 is a schematic configuration diagram of an imaging apparatus according to an embodiment of the present invention.

Next, an imaging apparatus according to an embodiment of the present invention will be described. Here, as an embodiment of the imaging apparatus of the present invention, an example in a case of applying the invention to an on-board camera will be described. FIG. 7 shows a situation where the on-board camera is mounted on a vehicle.

In FIG. 7, a vehicle 100 comprises: an outside-vehicle camera 101 that is for capturing an image of a blind area on a lateral side of a passenger seat; an outside-vehicle camera 102 that is for capturing an image of a blind area on a rear side of the vehicle 100; and an in-vehicle camera 103 which is mounted on the rear of the rearview mirror in order to capture an image in a range of field of view which is the same as that of a driver. The outside-vehicle camera 101, the outside-vehicle camera 102, and the in-vehicle camera 103 are imaging apparatuses, and each apparatus comprises the imaging lens according to the embodiment of the present invention; and an imaging element that converts an optical image, which is formed through an imaging lens, into an electrical signal. The on-board cameras (the outside-vehicle cameras 101 and 102 and the in-vehicle camera 103) of the present embodiment each comprise the imaging lens of the present invention. Thus, it is possible to capture a high quality image with a wide angle.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens component are not limited to the values shown in the numerical examples, and different values may be used therefor.

The imaging apparatuses according to the embodiment of the present invention are also not limited to the on-board cameras, but may include various embodiments such as a mobile terminal camera, a surveillance camera, and a digital camera.

EXPLANATION OF REFERENCES

100: vehicle
101, 102: outside-vehicle camera
103: in-vehicle camera
L11 to L24: lens
G1: first lens group
G1A: first A lens group
G1B: first B lens group
G2: second lens group
Sim: image plane
St: aperture diaphragm
wa: on-axis rays
wb: rays with maximum angle of view
Z: optical axis

What is claimed is:

1. An imaging lens consisting of, in order from an object side:
    a first lens group;
    a diaphragm; and
    a second lens group that has a positive refractive power,
    wherein the first lens group consists of, in order from the object side, a first A lens group that consists of a first-1 negative meniscus lens concave toward an image side and a first-2 negative meniscus lens concave toward the image side, and a first B lens group that consists of a first-3 positive lens or a first-3A negative lens and a first-3B positive lens,
    wherein the second lens group consists of, in order from the object side, a second-1 biconvex lens, a second-2 biconcave lens, a second-3 biconvex lens, and a second-4 negative meniscus lens that is concave toward the object side, or in order from the object side, a second-1 biconvex lens, a second-2 biconcave lens, a second-3A biconvex lens, a second-3B biconvex lens, and a second-4 negative meniscus lens that is concave toward the object side, and
    wherein the following conditional expressions (1) and (2) are satisfied, $$-1<(L22f+L22r)/(L22f-L22r)<0.5 \quad (1), \text{ and}$$

$$-0.6<f1A/f1B<-0.25 \quad (2),$$

where L22f is a radius of curvature of an object side surface of the second-2 biconcave lens,
L22r is a radius of curvature of an image side surface of the second-2 biconcave lens,
f1A is a focal length of the first A lens group, and
f1B is a focal length of the first B lens group.

2. The imaging lens according to claim 1, wherein the following conditional expression (3) is satisfied, $$-0.7<(L23r-L24f)/(L23r+L24f)<-0.1 \quad (3),$$

where L23r is a radius of curvature of an image side surface of the second-3 biconvex lens or the second-3B biconvex lens, and
L24f is a radius of curvature of an object side surface of the second-4 negative meniscus lens.

3. The imaging lens according to claim 1, wherein the following conditional expression (4) is satisfied, $$-1<f/f1A<-0.4 \quad (4),$$

where f is a focal length of a whole system.

4. The imaging lens according to claim 1, wherein the following conditional expression (5) is satisfied, $$-0.3<f/f24<0 \quad (5),$$

where f is the focal length of the whole system, and
f24 is a focal length of the second-4 negative meniscus lens.

5. The imaging lens according to claim 1, wherein the following conditional expression (6) is satisfied, $$-1<(L24f-L24r)/(L24f+L24r)<-0.2 \quad (6),$$

where L24f is a radius of curvature of an object side surface of the second-4 negative meniscus lens, and
L24r is a radius of curvature of an image side surface of the second-4 negative meniscus lens.

6. The imaging lens according to claim 1, wherein an air spacing is provided between the second-3 biconvex lens or the second-3B biconvex lens and the second-4 negative meniscus lens.

7. The imaging lens according to claim 1, wherein the following conditional expression (7) is satisfied, $$0.2<(L11f-L11r)/(L11f+L11r)<0.7 \quad (7),$$

where L1 if is a radius of curvature of an object side surface of the first-1 negative meniscus lens, and
L11r is a radius of curvature of an image side surface of the first-1 negative meniscus lens.

8. The imaging lens according to claim 1, wherein the first-2 negative meniscus lens is a lens of which object side and image side surfaces are aspheric surfaces and of which a negative refractive power becomes weak in a periphery thereof as compared with a vicinity of an optical axis thereof.

9. The imaging lens according to claim 1, wherein the second-4 negative meniscus lens is a lens of which object side and image side surfaces are aspheric surfaces and of which a negative refractive power becomes weak in a periphery thereof as compared with a vicinity of an optical axis thereof.

10. The imaging lens according to claim 1, wherein the following conditional expression (1-1) is satisfied $$-0.8<(L22f+L22r)/(L22f-L22r)<0.4 \qquad (1\text{-}1).$$

11. The imaging lens according to claim 1, wherein the following conditional expression (2-1) is satisfied $$-0.55<f1A/f1B<-0.3 \qquad (2\text{-}1).$$

12. The imaging lens according to claim 2, wherein the following conditional expression (3-1) is satisfied $$-0.6<(L23r-L24f)/(L23r+L24f)<-0.15 \qquad (3\text{-}1).$$

13. The imaging lens according to claim 3, wherein the following conditional expression (4-1) is satisfied $$-0.85<f/f1A<-0.5 \qquad (4\text{-}1).$$

14. The imaging lens according to claim 4, wherein the following conditional expression (5-1) is satisfied $$-0.23<f/f24<-0.03 \qquad (5\text{-}1).$$

15. The imaging lens according to claim 5, wherein the following conditional expression (6-1) is satisfied $$-0.85<(L24f-L24r)/(L24f+L24r)<-0.35 \qquad (6\text{-}1).$$

16. The imaging lens according to claim 7, wherein the following conditional expression (7-1) is satisfied $$0.3<(L11f-L11r)/(L11f+L11r)<0.6 \qquad (7\text{-}1).$$

17. An imaging apparatus comprising the imaging lens according to claim 1.

\* \* \* \* \*